United States Patent [19]

Zelczer et al.

[11] Patent Number: 5,458,148

[45] Date of Patent: Oct. 17, 1995

[54] FLUID FLOW CONTROL DAMPER ASSEMBLY AND METHOD

[76] Inventors: Alex Zelczer; Ruth Zelczer, both of 3840 Severn Rd., Cleveland Heights, Ohio 44118

[21] Appl. No.: 82,355

[22] Filed: Jun. 24, 1993

[51] Int. Cl.[6] .............................. F16K 43/00; F16K 1/22; F16K 31/126

[52] U.S. Cl. ............................ 137/15; 137/315; 251/58; 251/229; 251/252; 251/308

[58] Field of Search ........................... 251/58, 229, 251, 251/252, 305, 306, 308; 137/15, 315, 317, 318; 236/101 C; 285/197, 198, 199

[56] References Cited

U.S. PATENT DOCUMENTS

| | | | |
|---|---|---|---|
| 2,315,775 | 5/1941 | D'Arcey | 251/58 |
| 2,608,203 | 8/1952 | Butler | 137/171 |
| 2,676,604 | 4/1954 | Senna | 137/171 |
| 2,902,254 | 9/1959 | Conway et al. | 137/375 |
| 3,512,752 | 5/1970 | Uerlichs et al. | 251/308 |
| 3,580,238 | 5/1971 | Diehl | 126/295 |
| 3,771,759 | 11/1973 | Pauquette | 251/308 |
| 3,799,434 | 3/1974 | Heidacker | 251/305 |
| 4,147,298 | 4/1979 | Leemhuis | 137/499 |
| 4,189,092 | 2/1980 | Maxson et al. | 236/13 |
| 4,213,477 | 7/1980 | Velasquez | 251/305 |
| 4,241,897 | 12/1980 | Maezawa | 251/252 |
| 4,270,559 | 6/1981 | Wallberg | 251/305 |
| 4,301,831 | 11/1981 | Lord | 137/489.5 |
| 4,545,524 | 10/1985 | Zelczer | 236/46 R |
| 4,702,412 | 10/1987 | Zelczer et al. | 137/624.12 |
| 5,169,121 | 12/1992 | Blanco et al. | 251/305 |

OTHER PUBLICATIONS

Controlair Inc., catalogue entitled: "Diaphragm Air Cylinders", May 1992.
Controlair Inc., short form catalogue (date unknown).

Primary Examiner—George L. Walton
Attorney, Agent, or Firm—Renner, Otto, Boisselle & Sklar

[57] ABSTRACT

A fluid flow control damper assembly and associated method are characterized by a self-contained unit comprising a support base for external mounting to a side of a duct, a damper vane mounted to the support base for movement between open and closed positions, the damper vane being located inwardly of the inner side of the support base for positioning interiorly of the duct when the support base is mounted to the duct, and an actuator mounted to the support base and operatively connected to the damper vane for moving the damper between the open and closed positions, and wherein the support base functions to close an access opening in a side wall of the duct of sufficient size to permit insertion of the damper vane therethrough.

21 Claims, 15 Drawing Sheets

FLUID FLOW CONTROL DAMPER ASSEMBLY AND METHOD

The invention herein described relates generally to fluid flow control dampers and, more particularly, to a low pressure fluid operated fluid flow control damper assembly that is lightweight and easy to mount to existing ducts for controlling the flow of fluid through the duct. Because the invention was conceived and developed for HVAC systems, it will be described chiefly in this context. However, the invention in its broader aspects may be adapted for other applications as well.

BACKGROUND

Various types of damper devices have been developed over the years to control the flow of fluid through ducts in HVAC systems. The damper devices are used to control the flow of air through the systems' air ducts and range from a simple hand-turnable damper vane often found in residential buildings to motor driven mechanical damper assemblies more commonly used in commercial and industrial structures. Another type of damper device employs an inflatable bladder or bellows to control fluid flow through a duct, and details of particularly useful bladder-type flow control devices and associated systems can be found in U.S. Pat. Nos. 4,545,524 and 4,702,412. One advantage of the bladder-type flow control devices shown in these patents is that they could be easily retrofitted into existing ducts with minimal difficulty.

Another prior art type of damper device is a mechanical damper assembly comprising a short piece of duct in which a damper vane is provided with a shaft that is pivotally mounted for rotation in the short piece of duct. The damper vane is rotated between open and closed positions by a motor mounted to and outside the duct piece and connected to the damper vane shaft.

The aforesaid type of mechanical damper assembly is somewhat difficult to install in an existing duct. Installation requires the duct piece of the damper assembly to be spliced into the existing duct. This involves cutting out a length of the existing duct and usually dismantling of the existing duct to enable such cutting and/or assembly of the duct piece between adjacent sections of the existing duct. This dismantling, cutting and reassembling of the ductwork is time consuming and therefore an expensive operation when performed by paid installers.

The damper vanes in prior art mechanical damper assemblies heretofore have been driven by both electric and fluid motors. A drawback of electric damper motors is that often their life cycle is comparatively short and limited, thereby making motor replacement a relatively frequent and expensive maintenance operation. Another problem is that, in systems employing a considerable number of electric motor driven dampers, relatively complicated wiring schemes and transformers are often involved, all adding to the cost and complexity of the overall system. Fluid motors eliminate the electrical wiring problems and often have comparatively longer life cycles, but they too have had drawbacks associated therewith. Even with so-called frictionless diaphragm-type fluid motors, the actuator rods thereof are engaged by bearings and wipers that still hinder free linear movement of the rods. Also, to reduce friction, the rods are made of hardened steel as opposed to less expensive materials.

SUMMARY OF THE INVENTION

The present invention provides a novel fluid flow control damper assembly that overcomes many of the drawbacks associated with prior art damper assemblies. A preferred embodiment of a damper assembly according to the invention is a self-contained unit that is relatively easy to install in existing ducts when compared to the above described prior art mechanical damper assemblies that require splicing into ducts. A preferred embodiment of damper assembly is further characterized by a fluid motor that has a relatively long life when compared to the electric motors commonly used in prior art damper assemblies and reduced frictional resistance when compared to the above mentioned fluid motors. The fluid motor eliminates the need for complicated electrical wiring schemes, and in its preferred form the fluid motor is double acting although requiring only a single fluid supply line for pressure and/or vacuum.

According to one aspect of the invention, a damper assembly for controlling the flow of fluid through a duct, comprises a support base for external mounting to a side of a duct, a damper vane mounted to the support base for movement between open and closed positions, the damper vane being located inwardly of the inner side of the support base for positioning interiorly of the duct when the support base is mounted to the duct, and an actuator mounted to the support base and operatively connected to the damper vane for moving the damper between the open and closed positions, and wherein the support base includes a closure for closing an access opening in a side wall of the duct of sufficient size to permit insertion of the damper vane therethrough.

In a preferred embodiment, the closure includes a mounting member and a gasket at the inner side of the mounting member for providing a seal between the mounting member and the side wall of the duct. The actuator preferably includes a fluid motor of the type including a diaphragm. The damper vane may be pivotally mounted to the end of a mounting post extending inwardly from the support base, and the fluid motor may have an actuator member connected to the diaphragm and extending generally parallel to the mounting post for connection to the damper vane. In a preferred arrangement, the damper vane has a pivot block that is pivotally connected to the end of the mounting post, the actuator member is pivotally connected to the pivot block for effecting pivoting of the pivot block in response to axial movement of the actuator member, and the pivot block has stop surfaces thereon respectively engageable with the mounting post and actuator member to prevent the damper vane from being rotated beyond its open and closed positions. Ideally, the fluid motor and support base have oversize apertures for allowing free passage of the actuator member from the diaphragm out of the fluid motor and through the support base for essentially friction-free movement of the actuator member.

A preferred form of damper vane has a relatively rigid central portion and a resiliently flexible sealing flap extending around the periphery of the relatively rigid central portion. More particularly, the damper vane includes a pair of relatively rigid outer plates and a sheet of resiliently flexible material sandwiched between the outer plates and projecting outwardly beyond peripheral edges of the outer plates to form the sealing flap.

In other embodiments, the damper vane is rotatable with a tubular cam follower having a cam slot therein. The tubular cam follower is supported for rotation about an axis thereof by a tubular mounting post fixed with respect to the support base. The tubular mounting post includes a guide slot and the actuator includes an actuator member telescopically axially movable in the tubular mounting post and cam follower. The actuator member has thereon a cam element extending through the guide slot and cam slot, and the guide and cam slots are configured to effect rotational movement of the damper vane in response to telescoping axial movement of the actuator member. In one arrangement the mounting post extends inwardly from the inner side of the support base whereas in another arrangement the mounting post is located at the outer side of the support base. In either case, the damper vane may be detachably mounted to the cam follower for interchange with other damper vanes of different sizes and/or shapes.

The invention also provides a method of installing the damper assembly in a duct, comprising the steps of providing an access opening in the side wall of the duct that has a long dimension and a short dimension perpendicular to the axis of the duct, aligning the damper vane with the plane thereof generally parallel to the long dimension of the access opening and generally perpendicular to the short dimension of the access opening, then inserting the damper vane through the access opening into the interior of duct, and then positioning the support base to close the access opening.

According to another broad aspect of the invention, a damper assembly for controlling the flow of fluid through a duct, comprises a support base for external mounting to a side of a duct, the support base having inner and outer sides, a mounting post fixed with respect to the support base, a damper vane mounted to the mounting post for pivotal movement between open and closed positions, the damper vane being located inwardly of the inner side of the support base for positioning interiorly of the duct when the support base is mounted to the duct, and an actuator mounted to the support base and operatively connected to the damper vane for moving the damper vane between the open and closed positions.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed. It should be understood that while a particular feature of the invention may be described with respect to only one of the illustrated embodiments, such feature may be combined with one or more features of the other embodiment, as may be desired and advantageous for any given or particular application.

DETAILED DESCRIPTION

Figure 1:
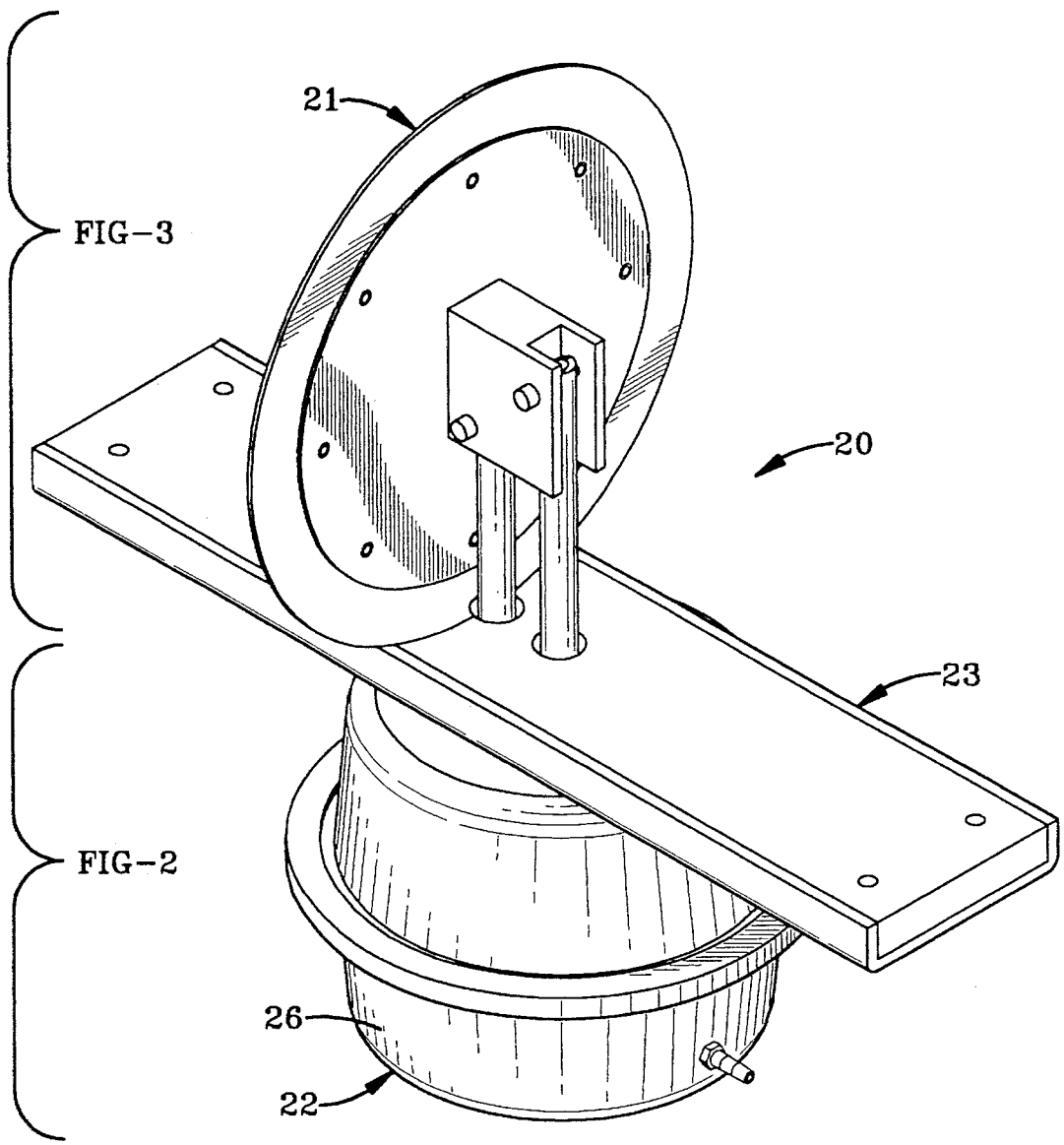
FIG. 1 is a perspective view of a fluid flow control damper assembly according to the invention.

Referring now in detail to the drawings and initially to FIG. 1, a preferred embodiment of a damper assembly according to the invention is designated generally by reference numeral 20. The damper assembly generally comprises a damper vane 21, a fluid motor 22 that functions as an actuator, and a support base 23. The damper vane 21 and fluid motor 22 are disposed on opposite sides of the support base 23. As described further below, the support base 23 is adapted to be mounted to the exterior of a duct with the fluid motor located outside the duct and the damper vane located within the duct for controlling the flow of fluid, such as air, through the duct.

Figure 2:
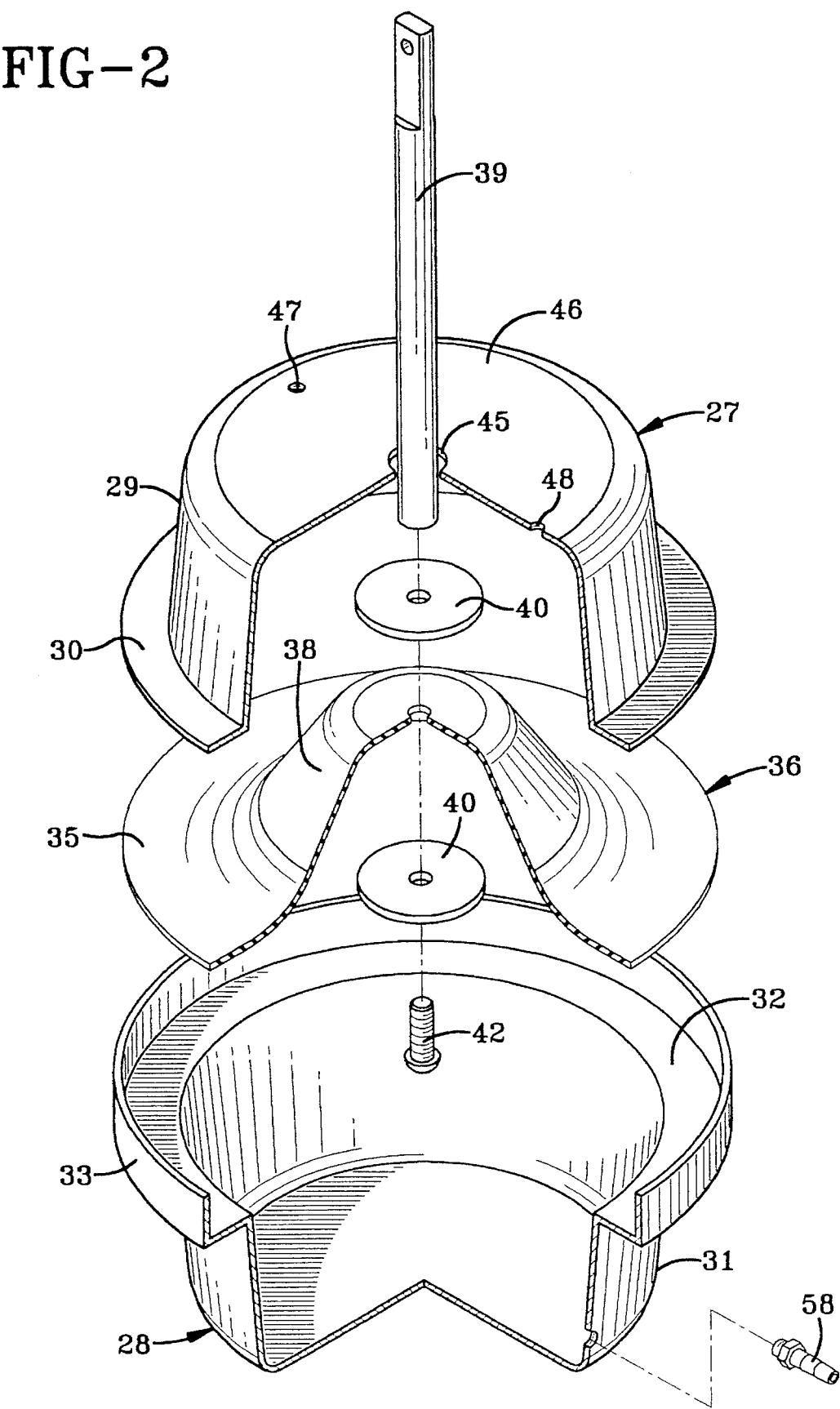
FIG. 2 is an exploded perspective view, partly broken away, showing the fluid motor of the damper assembly of FIG. 1.

In the broadest sense of the present invention, any form of actuator may be used in place of the fluid motor 22 such as an electric motor, solenoid, fluid expansion device, etc. However, preferably a fluid motor is used as opposed to an electrical device, and especially the fluid motor 22. The fluid motor 22 comprises a shell 26 which can be seen in FIG. 2 to have a front part 27 and a rear part 28. The front shell part 27 has a central dome portion 29 and a rim 30 which projects radially from the dome portion 28 at its open end. Like the front shell part 27, the rear shell part 28 has a central dome portion 31 and a rim 32. Unlike the front shell part 27, the rear shell part 28 also has a crimping lip 33 which extends along the outer peripheral edge of the rim 32. In FIG. 2, the crimping lip 33 is shown in its uncrimped condition, the lip being generally perpendicular to the plane of the rim 32 and forming a cylindrical socket for receiving the rim 30 of the front shell part 27 with a peripheral edge portion 35 of a diaphragm 36 sandwiched between the rims 30 and 32 of the front and rear shell parts. After the front and rear shell parts and the diaphragm have been assembled together as just described, the crimping lip 33 is crimped or otherwise folded radially inwardly over the rim 30 of the front shell part 27 to tightly clamp the peripheral edge portion 35 of the diaphragm 36 between the rims 30 and 32 of the shell parts 27 and 28. The crimping lip 33 in its crimped or folded over condition can be seen in FIG. 7.

The diaphragm 36 is made of a flexible material and preferably a resilient elastomeric material such as polyurethane. The diaphragm has a central dome portion 38 to which one end of an actuator member 39 is centrally connected at the apex of the dome. Although the actuator member may take various forms, a preferred form for low cost and weight is a rod as illustrated. A pair of washers 40 and a fastener 42 are provided to secure the fluid motor end of the actuator member 39 to the diaphragm in the manner illustrated in FIG. 7, the rod having a threaded opening at its end for receiving the threaded fastener 42.

Figure 7:
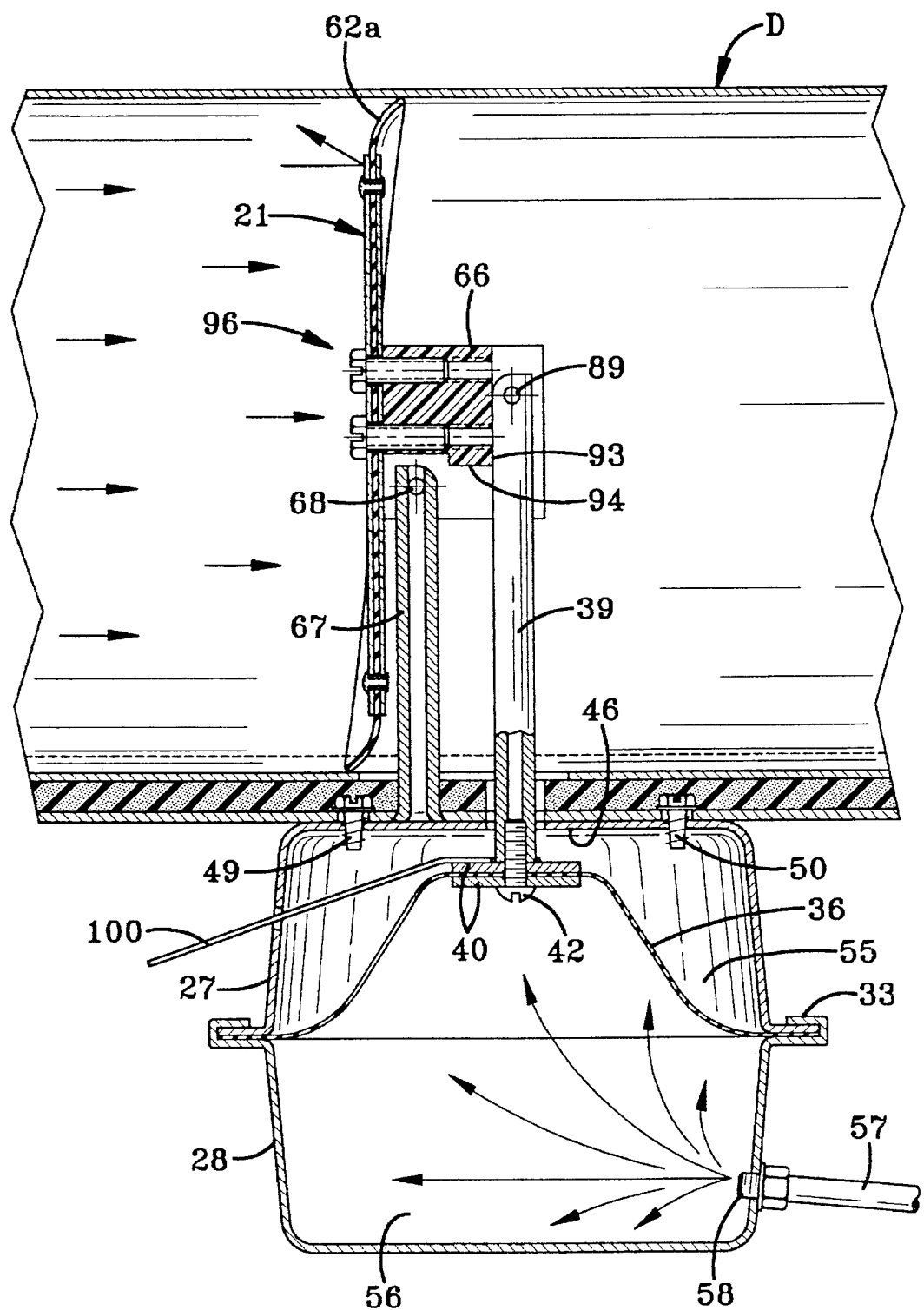
FIG. 7 is a cross-sectional view of the installed damper assembly taken along the line 7—7 of FIG. 5, showing the damper assembly in its fully closed position.

As seen in FIGS. 2 and 7, the actuator rod 39 extends through an oversized central opening 45 in the end wall 46 of the front shell part 27. The end wall 46, forming the front end wall of the shell 26, also has mounting holes 47 and 48 for attachment to the outer side of the support base 23 by fasteners 49 and 50 as illustrated in FIG. 7.

Figure 7A:
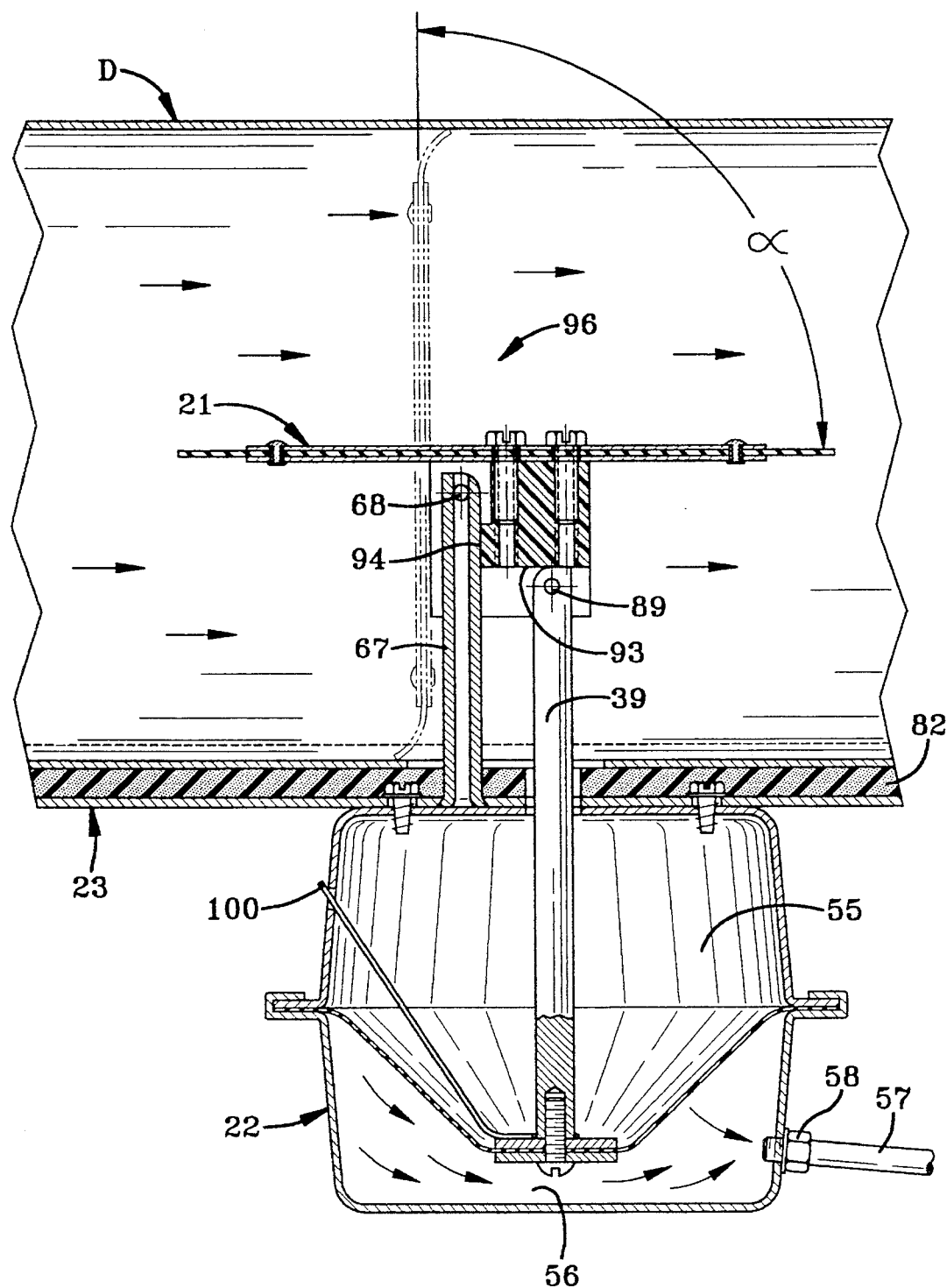
FIG. 7A is a cross-sectional view similar to FIG. 7, but showing the damper assembly in its fully open position.

As shown in FIG. 7, the diaphragm 36 divides the interior of the fluid motor shell 26 into a front chamber 55 and a rear chamber 56. The rear chamber 56 is a closed chamber to which an operating fluid is supplied under pressure by a supply line 57 to displace the diaphragm forwardly as shown in FIG. 7 or from which the operating fluid is evacuated or exhausted to displace the diaphragm downwardly as shown in FIG. 7A via the supply line 57. That is, the supply line 57 may function as a pressure or vacuum supply line to effect movement of the diaphragm within the fluid motor shell and corresponding movement of the actuator rod 39. The end of the supply line 57 is secured to a fitting 58 that is threaded into a hole in the side wall of the dome 31 of the rear shell part 28.

Figure 3:
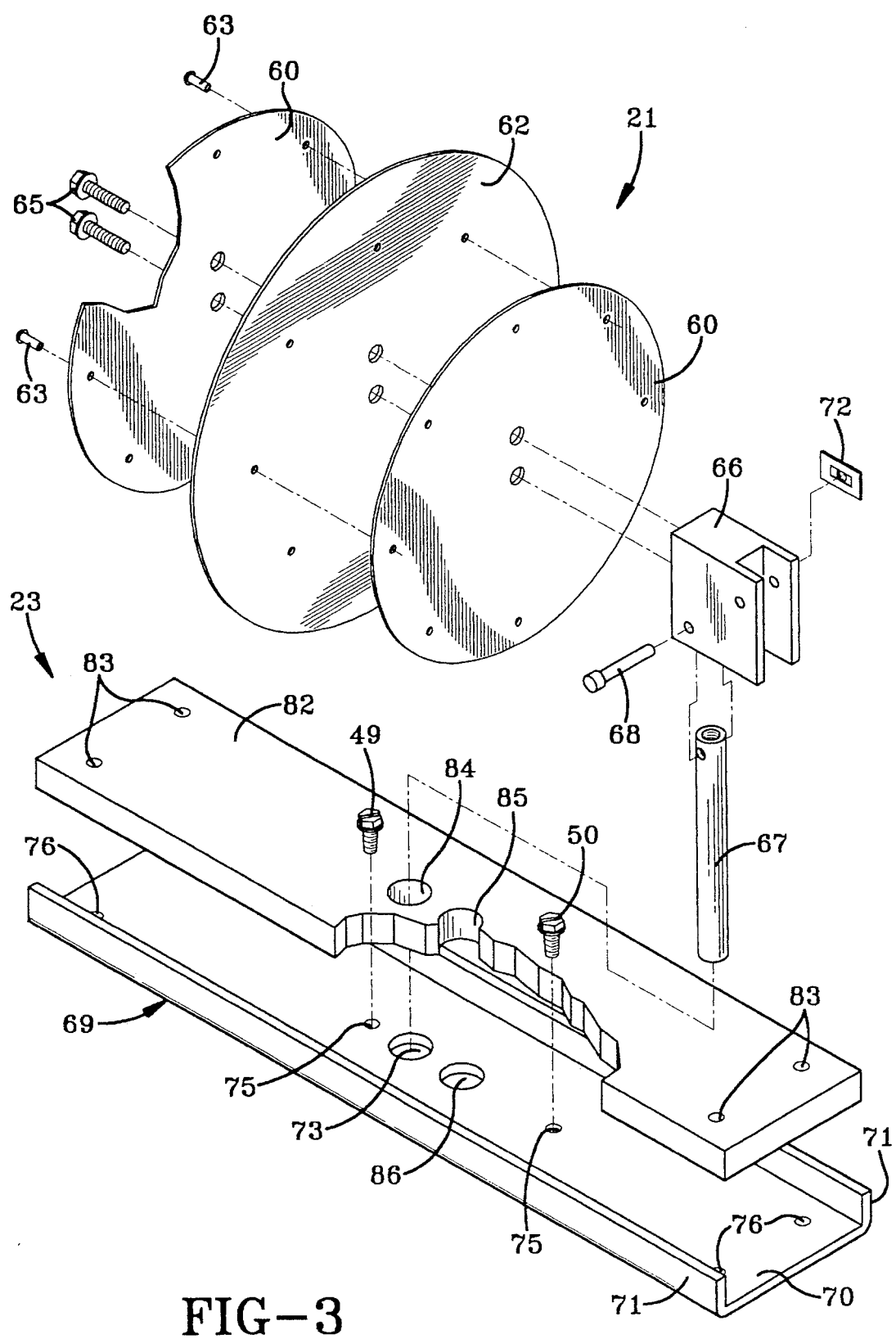
FIG. 3 is an exploded perspective view, partly broken away, showing the damper vane and mounting structure of the damper assembly of FIG. 1.

Referring now to FIG. 3, the components of a preferred form of damper vane 21 are illustrated, it being understood that other forms of damper vanes may be used as well while still obtaining advantages afforded by the present invention. The damper vane 21 comprises a pair of rigid outer plates 60 and 61 and an intermediate resilient sheet 62 that may be in the form of a disc as illustrated. The plates 60 and 61 are secured together with the resilient disc 62 sandwiched therebetween by a circumferential arrangement of rivets 63, although other fastening means may be used such as adhesives, screws, etc. As the illustrated damper vane 21 is intended for use in a circular duct, the plates 60 and 61 are circular as is the resilient disc 62. However, the damper vane may be of non-circular shape or use in non-circular ducts, as is discussed further below.

Figure 5:
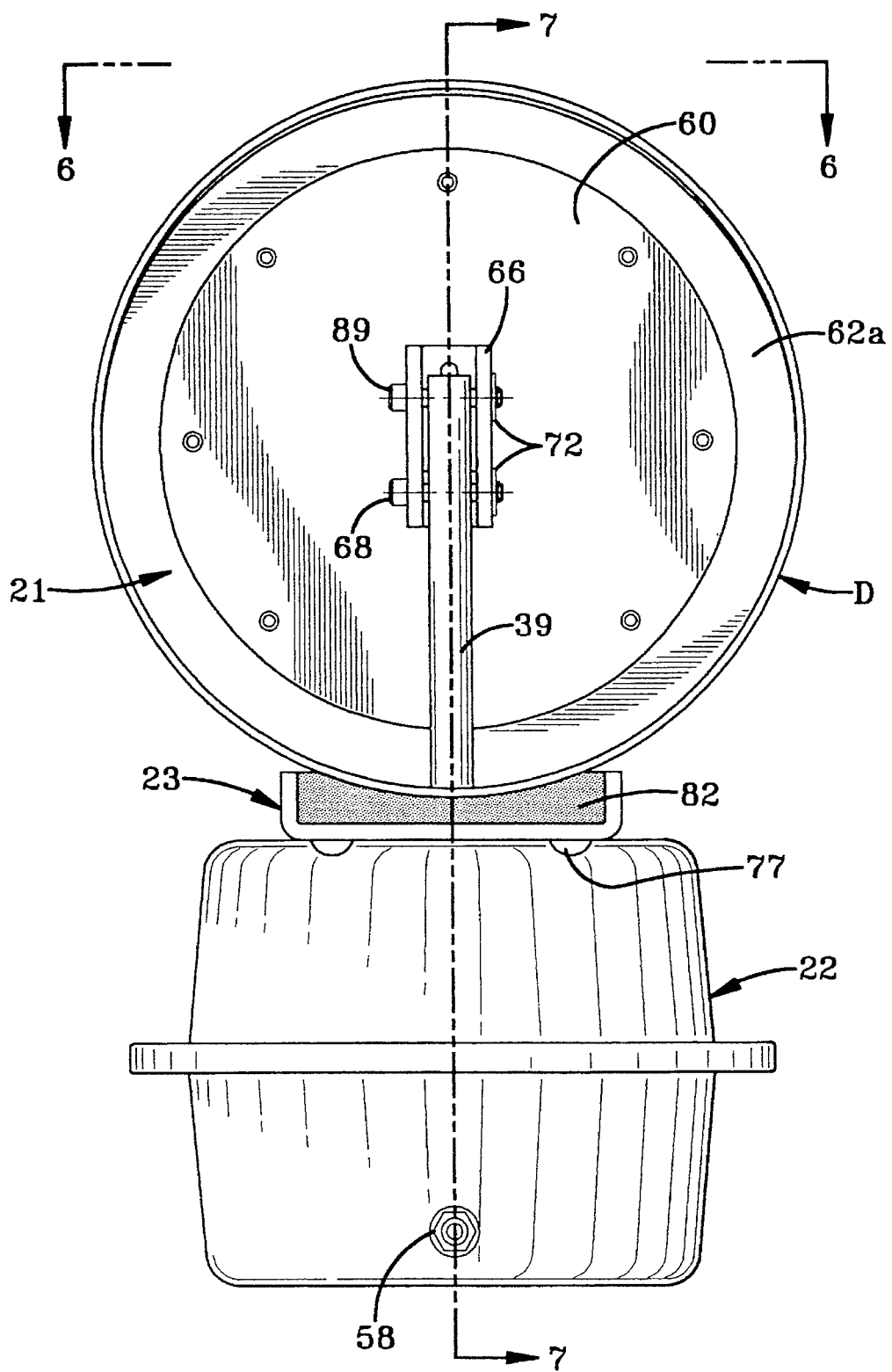
FIG. 5 is an end elevational view of the installed damper assembly looking from the line 5—5 of FIG. 4.

The resilient disc 62 has a diameter greater than the outer rigid discs 60 and 61 such that when the discs are coaxially secured together as further shown in FIGS. 5 and 7, the resilient disc 62 projects radially beyond the rigid discs to form a sealing flap 62a along the peripheral edge of the damper vane 21. As shown in FIG. 7, the circular plates 60 and 61 have a diameter less than the inner diameter of the duct D whereas the resilient disc 62, and consequently the sealing flap 62a, have an outer diameter greater than the inner diameter of the duct. Consequently, when the damper vane is in its closed position perpendicular to the axis of the duct, the peripheral sealing flap will resiliently engage and seal against the inner diameter surface of the duct thereby to close the gap between the outer diameter of the rigid discs 60 and 61 and the inner diameter of the duct. Also, the sealing flap can mold to the contour of the duct to provide a positive duct seal even if the ducts are dented or misshaped.

As seen in FIGS. 3 and 7, the damper vane 21 is secured by fasteners 65 or other means to a pivot mount 66 in the form of a block. The pivot block 66 is formed with a clevis at one side thereof for pivotal mounting to the end of a support arm or post 67 by a pivot pin 68 that is held in place by speed nut 72. In large size dampers, additional mounting posts or the like may be added to support the damper. The other or base end of the support arm or post 67 is joined to the support base 23 which, in the illustrated preferred embodiment, includes a shallow U-shape mounting bracket channel 69.

As best seen in FIG. 3, the mounting channel 69 has a base 70 and legs 71 that in cross-section are relatively wide and short, respectively. As shown, the base 70 has an opening 73 in which the lower end of the mounting post 67 is secured by suitable means. If the mounting post 67 and mounting channel 69 are formed of metal, then by way of example the mounting post may be secured to the base of the mounting channel by welding or brazing, for example. As an alternative, the mounting post 67 and mounting channel 69 may be formed from plastic in which case the mounting post may be secured by welding or use of a suitable adhesive, or the mounting post and mounting channel may be molded as a single piece.

The base 70 of the mounting channel 69 also can be seen in FIG. 3 to have openings 75 through which pass the shanks of the fasteners 49 for securing the fluid motor to the mounting channel at the side thereof opposite the damper 21. The base of the mounting channel also has at the outer ends thereof other apertures 76 which accommodate the shanks of threaded fasteners 77 used to secure the mounting channel 69 to the wall of a duct as shown in FIG. 4.

Figure 4:
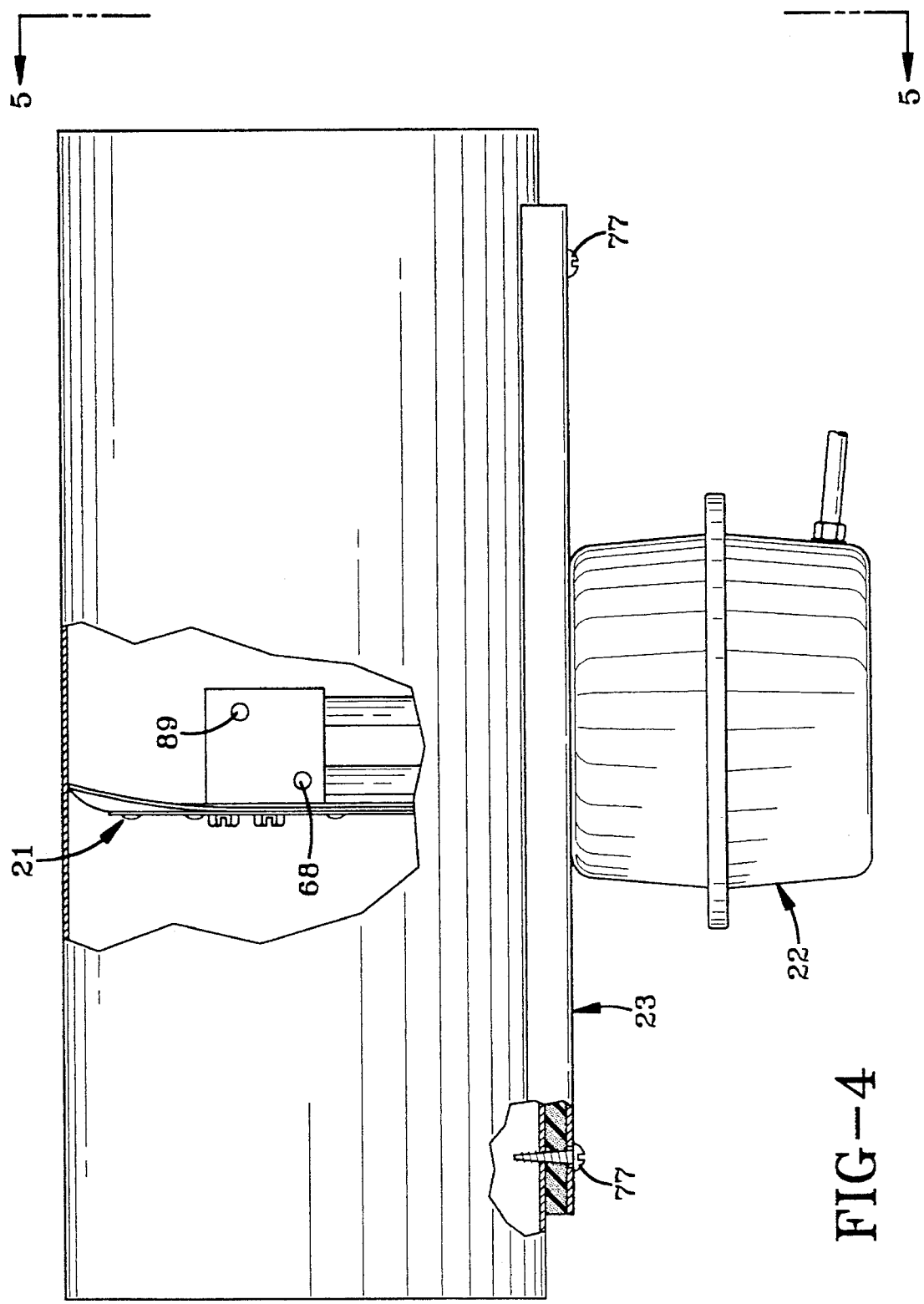
FIG. 4 is an elevational view, partly broken away, showing the damper assembly of FIG. 1 installed in a duct and in its fully closed position.

As seen in FIGS. 3–5, the support base further includes a gasket 82 that is interposed between the mounting channel and the side of the duct. The gasket 82 preferably is formed of a resilient gasket material such as a resilient foam insulation material, a preferred material being a closed cell polyethylene foam. The gasket material is sized to fit within and fill the bight of the mounting channel 69. That is, the gasket 82 fills the space between the legs 71 of the mounting channel and has a height substantially corresponding to the height of the legs 71. The gasket 82 has formed therein openings 83 corresponding to the holes 76 in the base of the mounting channel 69, a hole 84 through which the mounting arm 67 extends, and a hole 85 which is aligned with a corresponding hole 86 in the base 70 of the mounting channel 69. These holes 85 and 86 are in turn aligned with the hole 45 in the adjacent end wall 46 of the fluid motor shell as best illustrated in FIG. 7 for free passage therethrough of the actuator rod 39. The actuator rod does not require any bearings or guides that would add frictional resistance to axial movement of the actuator rod.

As seen in FIGS. 4, 5 and 7, the forward end of the actuator rod 39 is pivotally connected by a pivot pin 89 to the pivot block 66. The pivot pin 89 is spaced further from the plane of the damper vane 21 than the pivot pin 68. Also, the pivot pins 89 and 68 are offset from the center axis of the damper vane in opposite directions by an equal amount. Consequently, movement of the actuator rod in a direction generally parallel to the mounting post 67 will result in rotation of the damper vane through 90 degrees between a first or closed position extending generally parallel to the axis of the mounting post and a second or open position generally perpendicular to the axis of the mounting post. Also, the open position of the damper vane will bisect the closed position of the damper vane and, conversely, the closed position will bisect the open position of the damper vane. This is particularly desirable when the damper vane is disposed in a duct with its center axis aligned with the axis of the duct. Accordingly, the damper vane will rotate between its closed position coaxial with the duct and its open position coplanar with the axis of the duct.

The pivot block 66 is configured to provide positive stops for limiting movement of the damper vane beyond its open or closed positions. As seen in FIG. 7, the pivot block has a stop surface 93 that abuts the side of the actuator rod 39 when the damper vane is pivoted to its full closed position. As seen in FIG. 7A, the pivot block has another stop surface 94 which engages the side of the mounting post 67 to block pivoting of the damper vane beyond its full open position. The stop surfaces 93 and 94 respectively are parallel and perpendicular to the plane of the damper vane. As also shown in FIGS. 7 and 7A, the ends of the mounting post 67 and actuator rod 39 are rounded to permit relative pivoting of the pivot block in the illustrated configuration.

Figure 6:
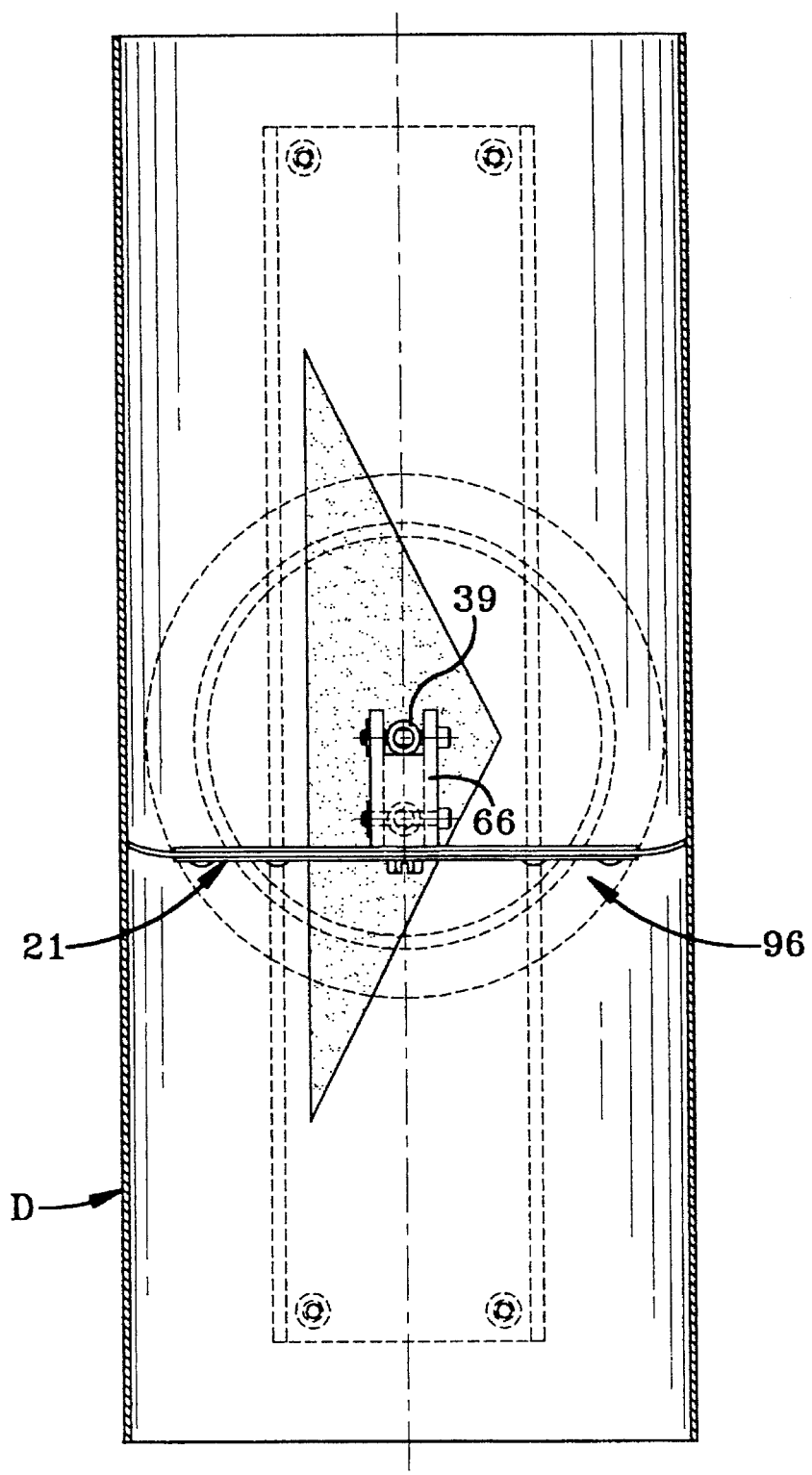
FIG. 6 is a top plan view of the installed damper assembly looking from the line 6—6 of FIG. 5 with the top half of the duct broken away in section.
Figure 6A:
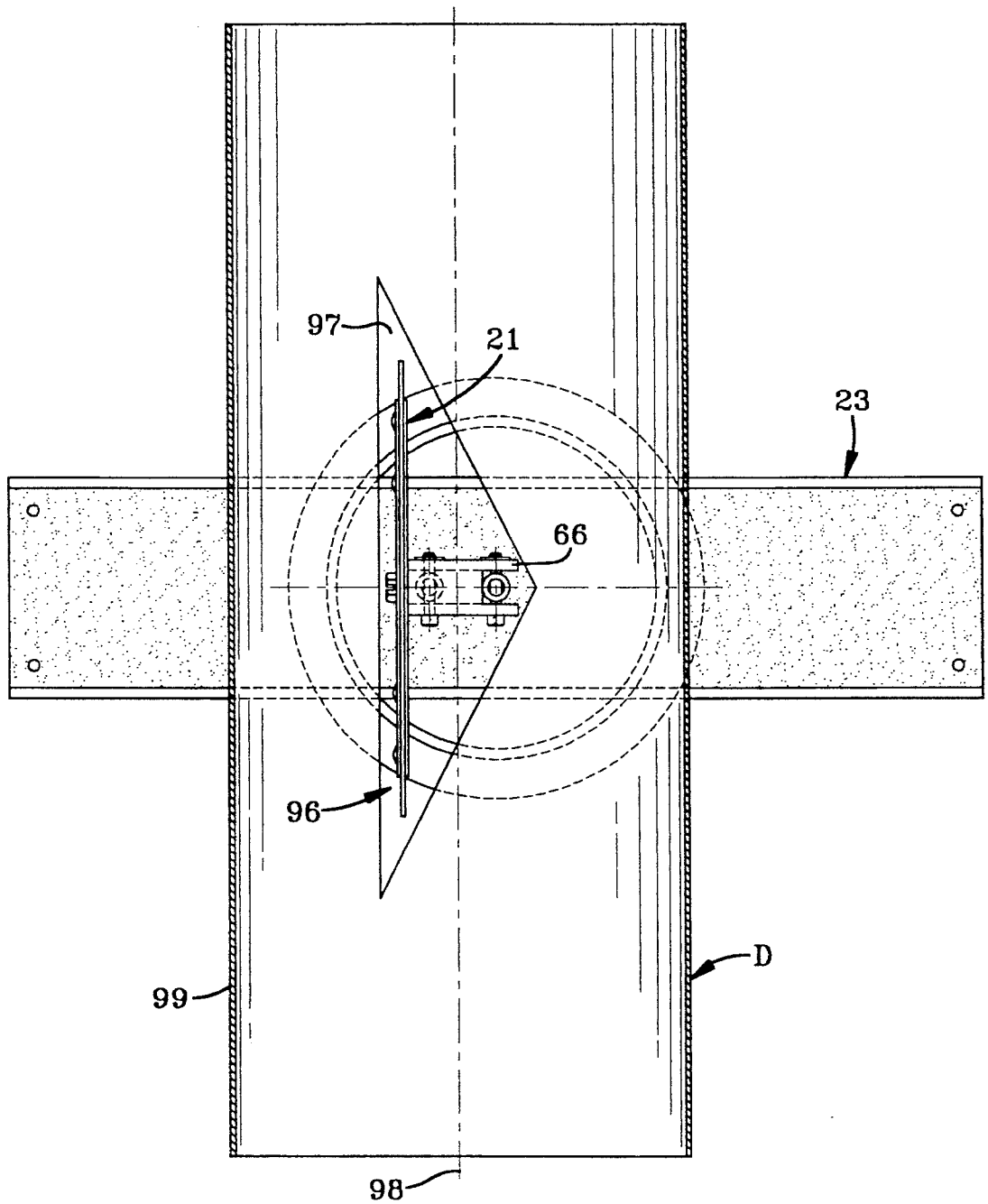
FIG. 6A is a top plan view similar to FIG. 6, but with the damper assembly shown rotated 90 degrees for installation into the duct.

As seen in FIGS. 6 and 6A, the front end portion 96 of the damper assembly 20 that is intended to be located interiorly of the duct has a generally T-shape profile in plan view when the damper vane is in its closed position perpendicular to the planar extent of the support base 23. More generally, the profile or envelope of this interior portion of the damper assembly in plan view has a maximum length corresponding to the diameter of the damper vane (or width of a non-circular vane) and a maximum width that is less than the diameter (or width) of the damper vane. In the illustrated embodiment, the profile width is less than about one-third the profile length.

This narrow profile enables the front end or interior portion 96 of the damper assembly 20 to be inserted through a correspondingly narrow access hole 97 provided in the wall of the duct D with the long dimension of the access hole 97 extending generally parallel to the axis 98 of the duct. As seen in FIG. 6A, the access hole 97 has a length sufficient to accommodate the width of the damper vane, and a width and configuration sufficient to accommodate the combined thickness of the damper vane and the adjacent mounting and actuator structure. As shown, the access hole may have a triangular shape which can be relatively easily cut in the wall 99 of the duct D.

As shown in FIGS. 6 and 6A, the longer dimension of the profile of the interior portion 96 of the damper assembly 20 is oriented at right angles to the length dimension of the support base. Moreover, the support base 23 or channel 69 has a width greater than the shorter dimension of the interior component's profile and a length dimension greater than the length dimension of the interior component's profile. Accordingly, the damper assembly may first be oriented with the plane of its damper vane parallel to the axis of the duct D as shown in FIG. 6A for insertion through the access opening, after which the damper assembly may be rotated 90 degrees properly to orient the damper vane with its pivot axis perpendicular to the axis 98 of the duct. At the same time, the support base, initially extending at right angles to the axis of the duct, will be oriented parallel to the duct and coextensively with the access opening. Because of its larger dimensions, the support base and, in particular, the gasket therein, will span the access opening. Moreover, the gasket will confirm to the contour of the duct to provide a seal around the access opening. Accordingly, the support base includes structure that functions as a closure that covers and preferably seals the access opening in the duct through which the damper vane may be inserted into the interior of the duct. The support base may be secured in place using the fasteners 77 or any other suitable means for securing the support base to the duct, as in the illustrated piggy-back manner. As will be appreciated by those skilled in the art, the support base may take different forms and use different closure structure that provides for covering of the access opening. By way of further example, the support base may include a magnetic plate of flexible material that functions to magnetically attach to ducts made of ferromagnetic material around the periphery of the access opening to effect closure of the opening as well as attachment of the overall damper assembly to the duct. Hence, a gasket will not always be needed.

When the damper assembly 20 is installed as above described and shown in the drawings, the damper vane 21 may be rotated between open and closed positions through operation of the fluid motor. The closed chamber 56 of the fluid motor may be connected to a vacuum source via supply line 57 to retract the actuator rod 39 and thereby rotate the damper vane 21 to its open position, it being noted that the chamber 55 on the opposite side of the diaphragm is exposed to atmospheric pressure or fluid pressure in the duct D via the opening 45 (FIG. 2) in the front wall of the fluid motor shell. Preferably the front side of the diaphragm is exposed to fluid pressure in the duct. When fluid is flowing through the duct, the pressure acting on the front side of the diaphragm will be greater than atmospheric pressure and thereby will provide greater opening force when compared to just atmospheric pressure acting on the front side of the diaphragm. Also, such arrangement provides for biasing of the damper vane to its open position as may be desirable in the event of a system failure resulting in loss of supply pressure used to open the damper.

To close the damper vane, an operating fluid may be supplied under pressure via supply line 57 to the closed chamber 56. This causes extension of the actuator rod and rotation of the damper vane to its closed position.

The damper assembly preferably is provided with means for enabling observation of the position of the damper vane when the damper assembly is mounted in piggy-back fashion to a duct as shown. Normally, the damper vane will be hidden from view by the duct. Consequently, one cannot observe the damper vane to confirm proper operation. The observation means may take a variety of forms including making the shell of the fluid motor out of a transparent material to permit viewing of the position of the diaphragm which will be indicative of the position of the damper vane.

As shown in FIG. 7, an indicator 100 in the form of a flexible wire may be used. The indicator wire has one end attached by suitable means to the washer 40 which moves with the actuator rod 39. The other or free end of the indicator wire extends through an opening in the side wall of the shell 26 for viewing outside the shell. When the damper vane is closed the indicator wire will be positioned as shown in FIG. 7 whereas it will be positioned as shown in FIG. 7A when the damper vane is open. In this manner, one can ascertain the position of the damper vane by the position of the indicator wire outside the shell. The indicator wire may be made of piano wire, but other types of indicators may also be used.

Figure 7B:
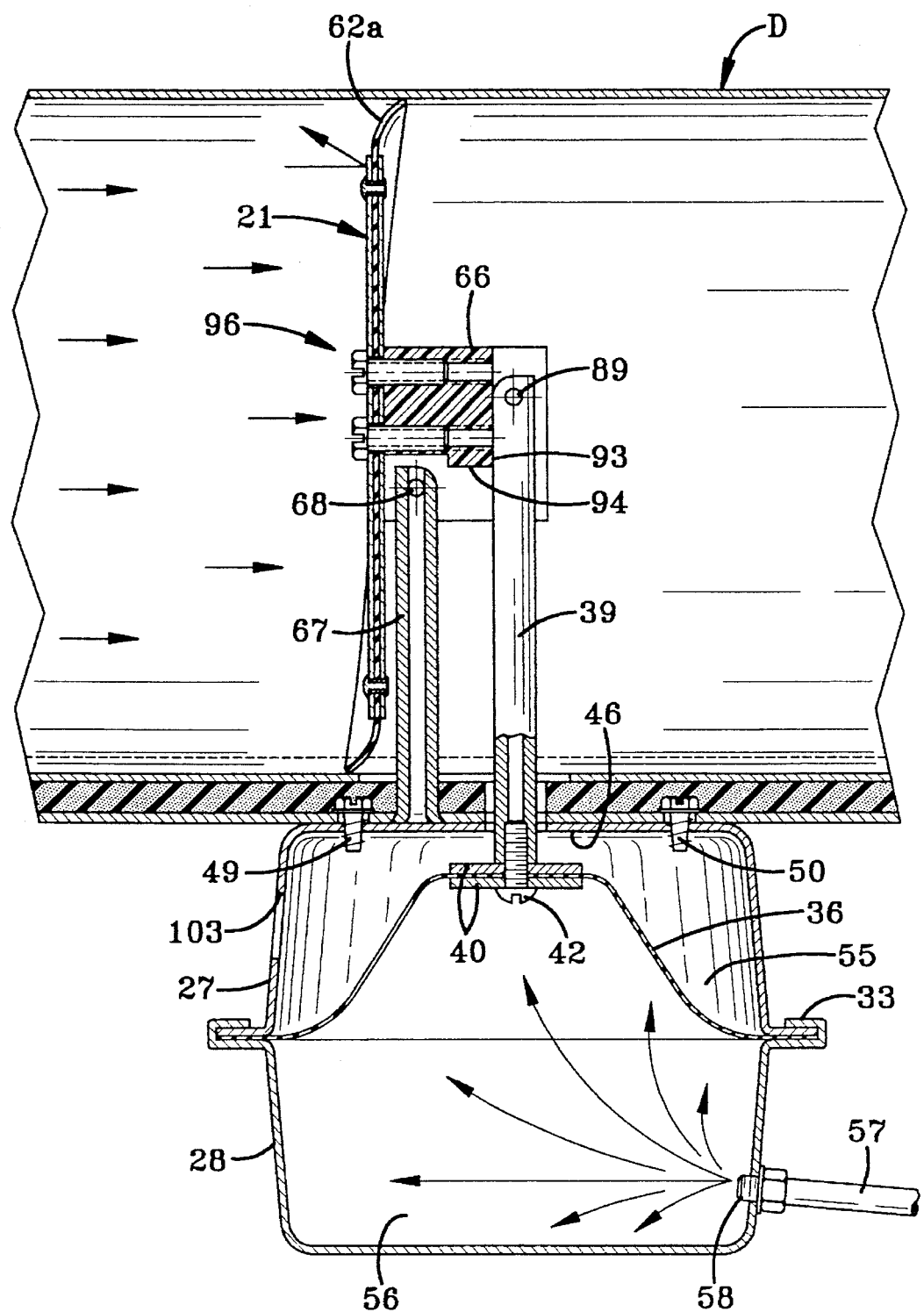
FIG. 7B is a cross-sectional view similar to FIG. 7, showing a different arrangement for observing the position of the damper from outside the duct.

In FIG. 7B, still another arrangement is shown. In this modified form, the shell is simply provided with a window 103 in the wall thereof to permit viewing of the position of the diaphragm. This is a very simple solution, but is somewhat less desirable than an indicator device that is more easy to view when the damper assembly is located overhead.

As will be appreciated, springs or other biasing means may be provided to bias the damper assembly towards its closed position or to its open position. For example, a coil spring may be interposed between the diaphragm and the front wall of the fluid motor shell to bias the actuator rod to its retracted open position. This eliminates the need to apply a vacuum, i.e., the closed chamber may then simply be exhausted to atmospheric pressure to effect opening of the damper vane. Conversely, the diaphragm may be oppositely biased to its closed position by a spring interposed between the diaphragm and the rear wall of the fluid motor shell. Then, a vacuum is supplied to open the damper vane and then released to permit closure of the damper vane under the action of the spring or other biasing device.

Of course, the illustrated fluid motor may be replaced by other motors including even electric motors such as solenoids.

However, the illustrated fluid motor is a preferred motive device according to the invention. Such fluid motor may be operated at low pressures such as at about 1 psi, thereby enabling the use of small pumps such as vibration type diaphragm pumps. Such pumps may be used as a source of vacuum or a source of pressure, as in the manner described in U.S. Pat. No. 4,702,412 which is hereby incorporated herein by reference. This patent describes a zone control system in which the flow control dampers of the present invention may be used in place of the bladder-type dampers disclosed in said patent.

Figure 8:
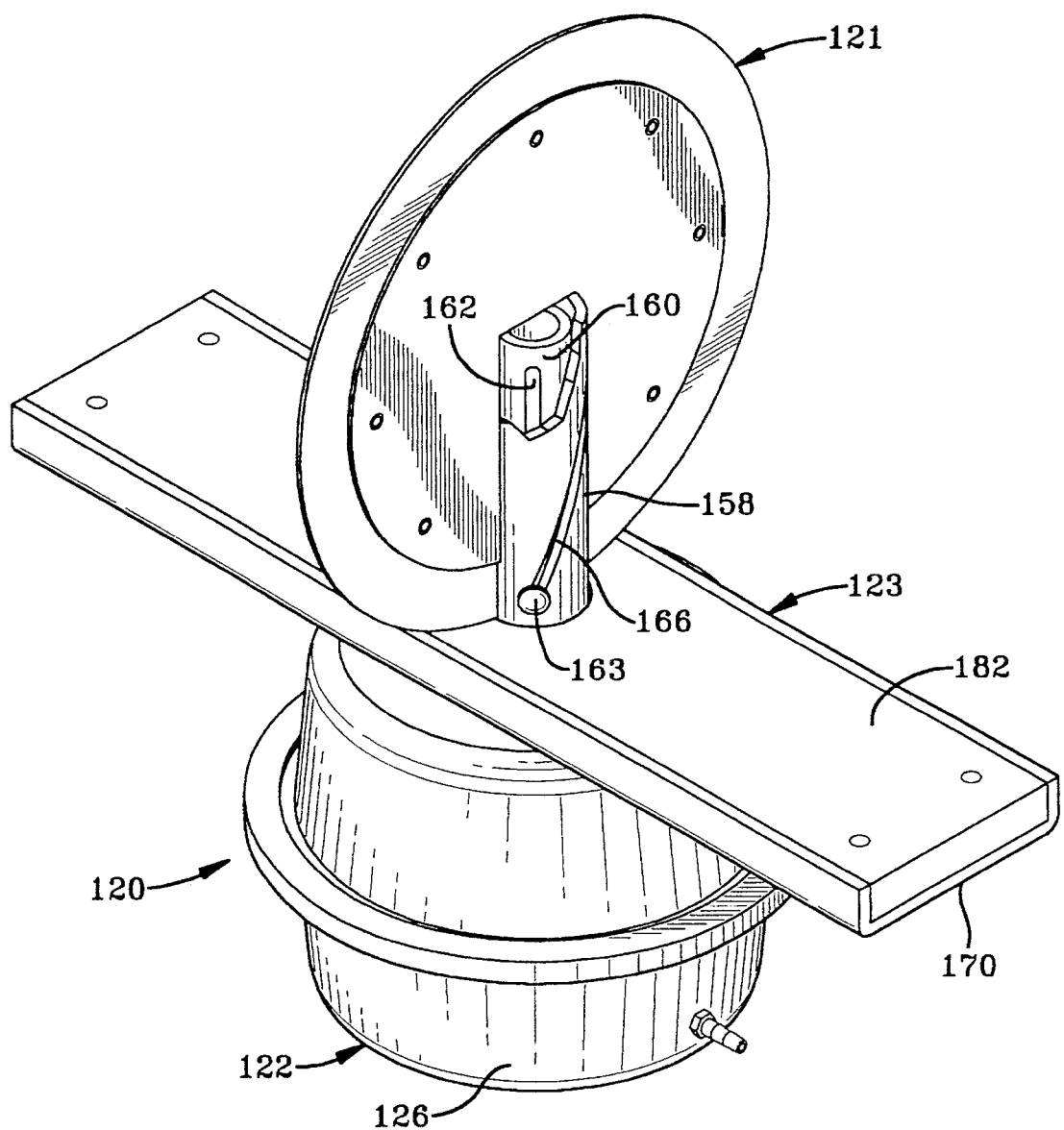
FIG. 8 is a perspective view of another embodiment of damper assembly according to the invention, shown in its fully closed position.
Figure 9:
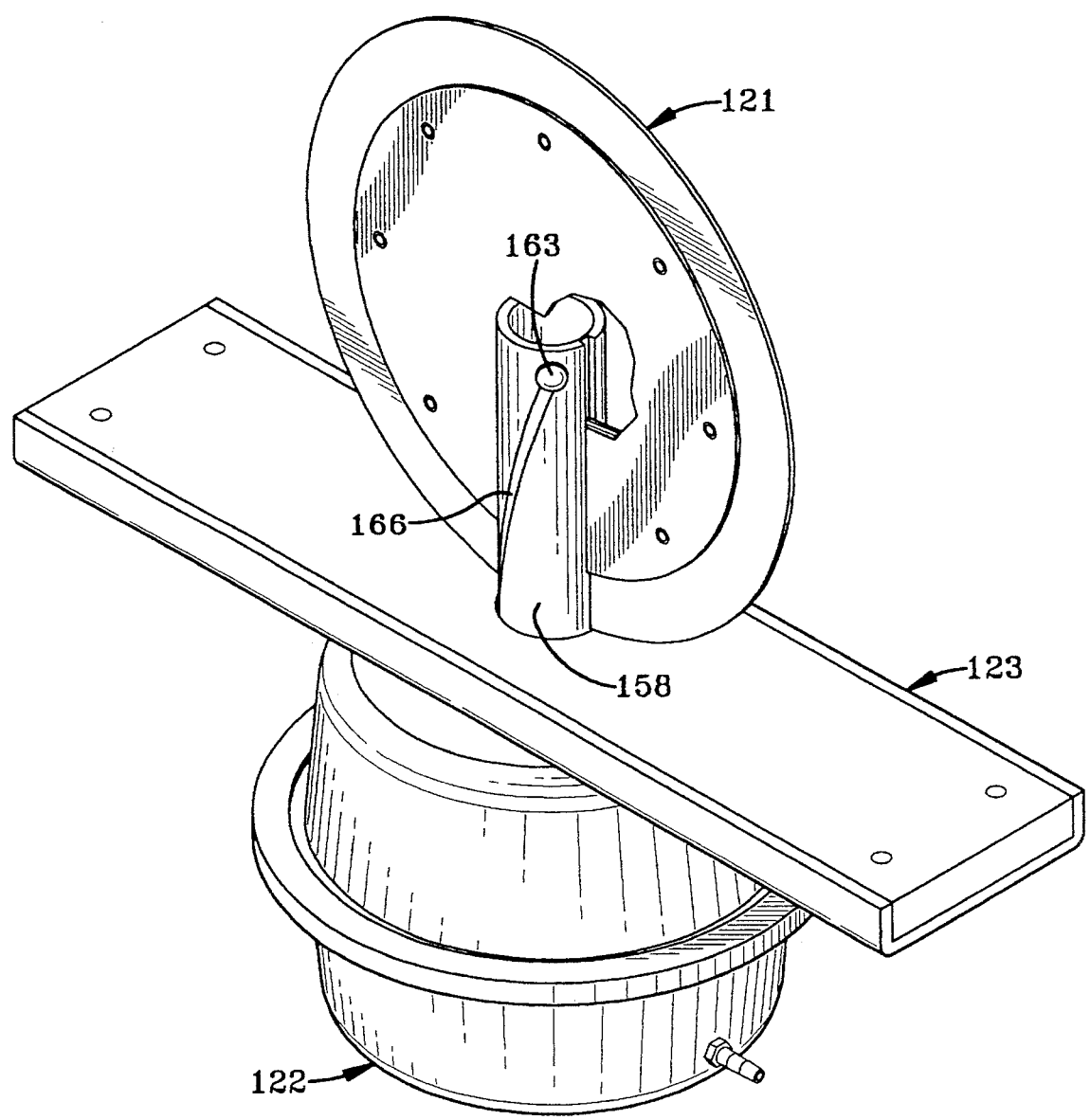
FIG. 9 is a perspective view similar to FIG. 8, showing the damper assembly thereof in its fully open position.
Figure 10:
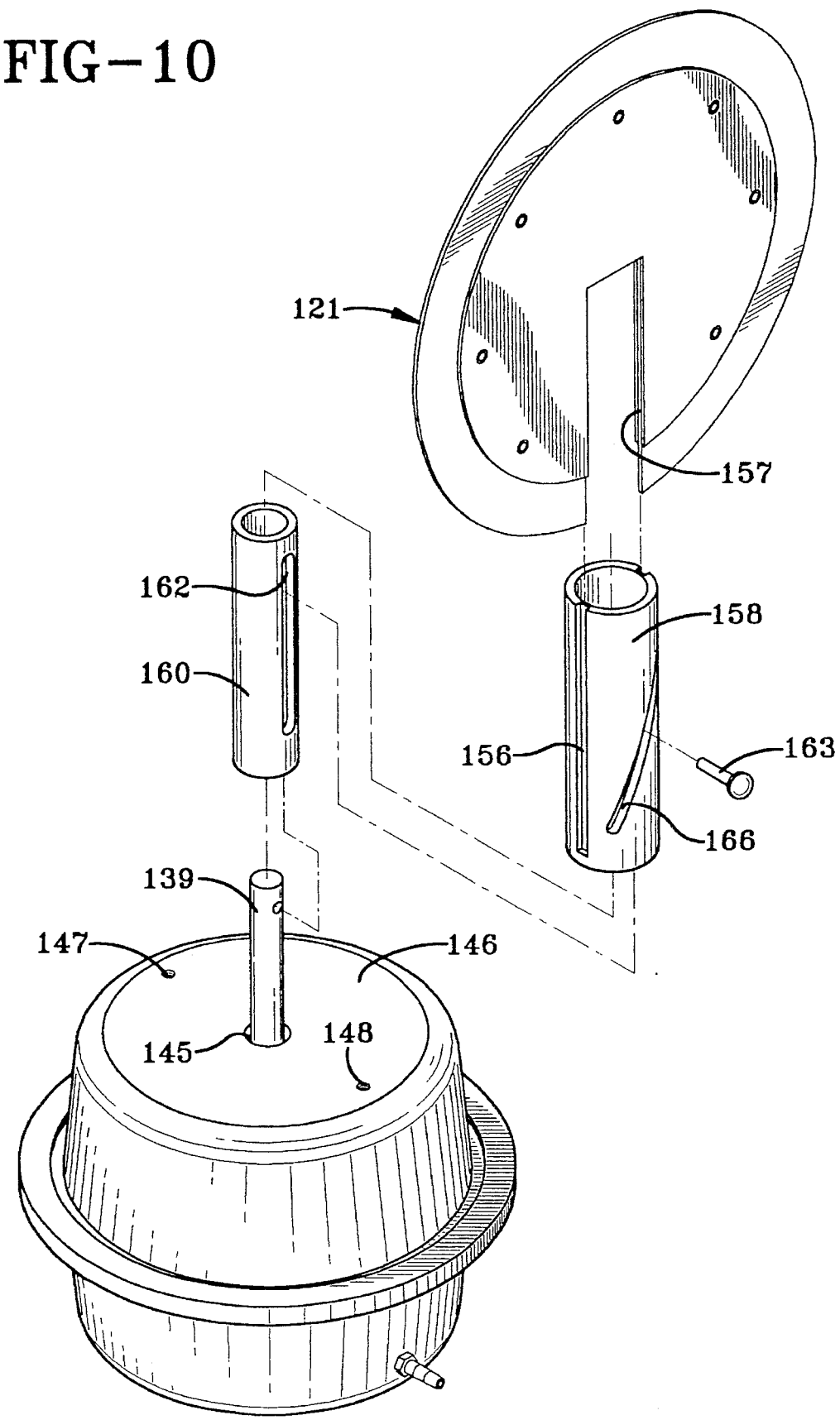
FIG. 10 is an exploded perspective view showing the interconnection between the damper vane and the fluid motor in the damper assembly of FIG. 8.

Referring now to FIGS. 8–10, another preferred embodiment of a damper assembly according to the invention is designated generally by reference numeral 120. The damper assembly generally comprises a damper vane 121, a fluid motor 122 and a support base 123. The damper vane 121 and fluid motor 122 are disposed on opposite sides of the support base 123, the support base 123 being adapted to be mounted to the exterior of a duct with the fluid motor located outside the duct and the damper vane located within the duct for controlling the flow of fluid, such as air, through the duct.

The fluid motor 122 is identical to the fluid motor 22. Accordingly, the fluid motor comprises a shell 126 which houses a diaphragm to which an actuator rod 139 is connected. As seen in FIG. 10, the rod extends through a central opening 145 in the front end wall 146 of the shell. The end wall 146 has mounting holes 147 and 148 for attachment to the outer side of the support base 123 in the same manner described above in conjunction with the damper assembly 20 of FIGS. 1–7.

The damper vane 121 also is identical to the damper vane 21 of the damper assembly 20, except for a slot 157 extending inwardly from the perimeter of the damper vane. The slot 157 has fitted therein a tubular bushing 158. The tubular bushing has longitudinally extending slots 156 at opposite sides thereof for capturing the side edges of the slot 157 in the damper vane thereby to key the damper vane to the tubular bushing for common rotational movement. Preferably, the damper vane fits on the tubular bushing with a slip fit. This is advantageous by providing for easy coupling of one of a variety of sizes and/or shapes of vanes that may be provided for adaptation of the damper assembly to different sizes and shapes of ducts. Also, the slip fit will aid in centering the damper vane in a duct that may be dented or bent.

The tubular bushing 158, which preferably is cylindrical, is telescoped over a tubular mounting arm or post 160 which is fixed at one end to the channel of the support base 123 against rotation relative to the support base. The tubular bushing, however, is supported by the mounting post for rotation about the axis of the mounting post.

The actuator rod 139 is telescopically movable in the tubular mounting post 160. The mounting post 160 has a longitudinally extending guide slot 162 through which a cam element 163 in the form of a pin extends. The cam pin 163 has one end thereof fixedly secured to the actuator rod. Accordingly, axial movement of the actuating rod will correspondingly move the cam pin back and forth in the guide slot in the mounting post which prevents rotation of the pin about the axis of the mounting post.

The cam pin 163 also extends through a helical cam slot 166 in the mounting bushing 158 which, accordingly, functions as a cam follower. Forward extension of the actuator rod 139 will urge the cam pin against the forward side of the helical cam slot 166 to rotate the damper vane 121 from its full closed position shown in FIG. 8 to its full open position shown in FIG. 9. Conversely, rearward retraction of the actuator rod will urge the cam pin against the rearward side of the cam slot to rotate the damper vane from its full open to its full closed position. The ends of the guide slot 162 in the mounting post provides positive stops for the cam pin corresponding to full open and full closed positions of the damper vane. That is, the cam pin engages the ends of the guide slot 162 in the mounting post at the full open and full closed positions of the damper vane, respectively.

The support base 123 is essentially the same as the support base 23 of the damper assembly 20, except there need only be provided a single hole in the base 170 of the mounting channel at which the mounting post 162 is secured and through which the actuator rod 139 extends. Preferably, the mounting bushing 158 projects radially outwardly beyond the peripheral edge of the damper plate and bears against the base 169 of the mounting channel in order to properly position the damper vane within the duct when the damper assembly is mounted to the duct. The damper assembly 120 further comprises a gasket 182 essentially the same as the gasket 82 of the damper assembly 20, except that it need only make provision for passage of the mounting post commonly with the actuator rod.

Like the damper assembly 20, the interior portion of the damper assembly 120 that is intended to be located interiorly of the duct has a narrow profile in plan view. More generally, the profile of the interior portion of the damper assembly has a maximum length corresponding to the diameter of the damper and a maximum width that is less than the diameter of the damper. In the illustrated embodiment, the profile width corresponds to the outer diameter of the mounting bushing 158. Accordingly, the damper assembly 120 can be mounted to a duct in essentially the same way as the damper assembly 20 is mounted to the duct. That is, the narrow profile enables the interior portion of the damper assembly 120 to be inserted through a correspondingly narrow access hole provided in the wall of the duct with the long dimension of the access opening extending generally parallel to the axis of the duct. The support base has a width greater than the width dimension of the interior component's profile and a length dimension greater than the length dimension of the interior component's profile. Because of its larger dimensions, the support base and, in particular, the gasket therein, will span the access opening. Moreover, the gasket will conform to the contour of the duct to provide a seal around the access opening.

Figure 11:
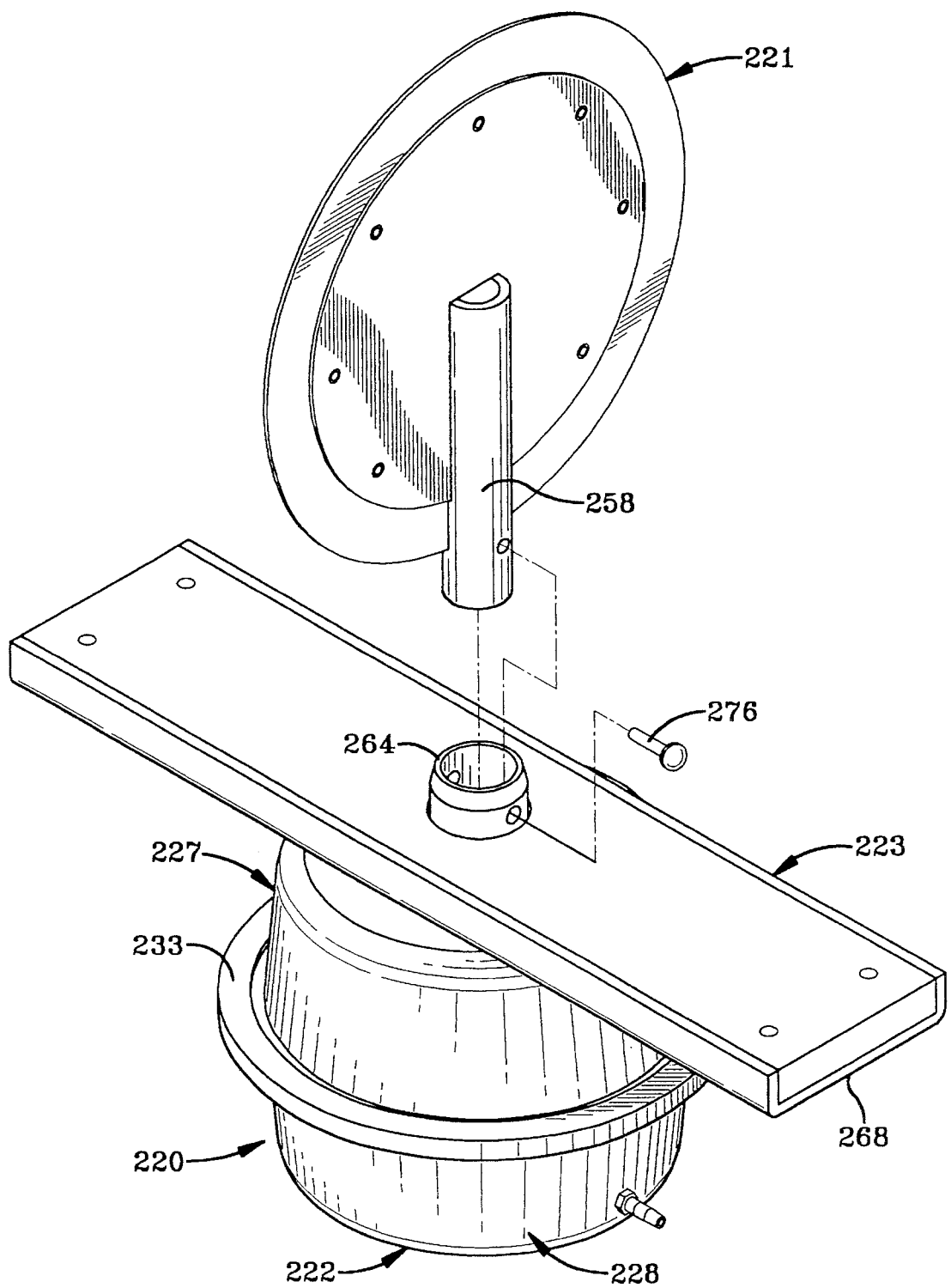
FIG. 11 is a perspective view, partly exploded, of another embodiment of damper assembly according to the invention.
Figure 12:
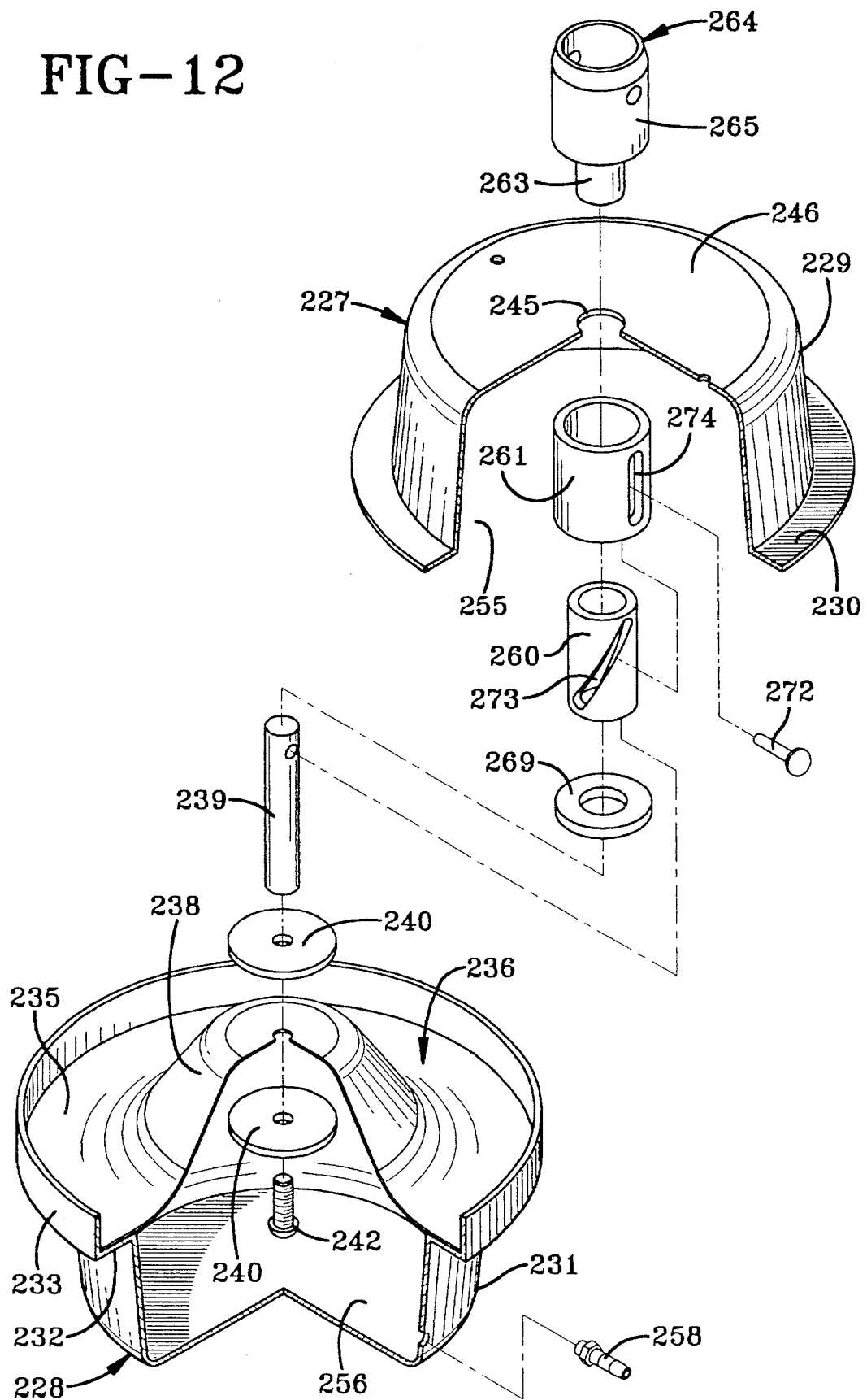
FIG. 12 is an exploded perspective view showing the interior components of the fluid motor in the damper assembly of FIG. 11.

Referring now to FIGS. 11 and 12, another preferred embodiment of damper assembly is indicated generally at 220. The damper assembly generally comprises a damper vane 221, a fluid motor 222 and a support base 223. The damper vane 221 and fluid motor 222 are disposed on opposite sides of the support base 223, and the support base 223 is adapted to be mounted to the exterior of a duct with the fluid motor located outside the duct and the damper vane located within the duct for controlling the flow of fluid, such as air, through the duct.

Like the above described fluid motor 22 and 122, the fluid motor 222 comprises a shell which has a front part 227 and a rear part 228. The front shell part 227 has a central dome portion 229 and a rim 230 which projects radially from the dome portion 229 at its open end. Like the front shell part 227, the rear shell part 228 has a central dome portion 231 and a rim 232. Unlike the front shell portion 227, the rear shell portion 228 also has a crimping lip 233 which extends along the outer peripheral edge of the rim 232. In FIG. 2, the crimping lip 233 is shown in its uncrimped condition, the lip being generally perpendicular to the plane of the rim 232 and forming a cylindrical socket for receiving the rim 230 of the front shell part 227 with a peripheral edge portion 235 of a diaphragm 236 sandwiched between the rims 230 and 232 of the front and rear shell parts. After the front and rear shells and the diaphragm have been assembled together as just described, the crimping lip 233 is crimped or otherwise folded radially inwardly over the rim 230 of the front shell part 227 to tightly clamp the peripheral edge portion 235 of the diaphragm 236 between the rims 230 and 232 of the shell parts 227 and 228. The crimping lip 233 in its crimped or folded over condition can be seen in FIG. 11.

The diaphragm 236 is made of a flexible material and preferably a resilient elastomeric material such as polyurethane. The diaphragm has a central dome portion 238 to which one end of an actuator rod 239 is centrally connected at the apex of the dome. A pair of washers 240 and a fastener 242 are provided to secure the fluid motor end of the rod 239 to the diaphragm, the rod having a threaded opening at its end for receiving the threaded fastener 242.

The diaphragm 236 divides the interior of the fluid motor shell 226 into front 255 and rear chambers 256. The rear chamber 246 is a closed chamber to which an operating fluid is supplied under pressure by a supply line to displace the diaphragm forwardly or from which the operating fluid is evacuated or exhausted to displace the diaphragm downwardly via the supply line. That is, the supply line may function as a pressure or vacuum supply line to effect movement of the bladder within the fluid motor shell and corresponding movement of the actuating rod 239. A fitting 258 is threaded into a hole in the side wall of the dome 231 of the outer shell part 228 for attachment of the supply line.

The actuator rod 239 is telescopically movable in a cam follower 260 with is housed within a tubular post or bushing 261 for rotation about the axis of the actuator rod. The tubular bushing 261 is mounted centrally to the interior of the end wall 246 of the front shell part 227 in line with a central opening 245 in the end wall. Extending through this opening is a reduced diameter end portion 263 of a vane mounting member 264. The reduced diameter end portion 263 is fixedly secured to the end of the cam follower 260 for common rotation with the cam follower. The larger diameter body 265 of the vane mounting member 264 is disposed outside the fluid motor shell and extends through an oversized opening 267 in the base 268 of the support base 223 which is essentially the same as the above described support bases 23 and 123 aside from the opening 267 in the central region thereof. As a result of this construction, the cam follower is restrained from axial movement while being rotatable about its axis within the mounting bushing. A washer bearing 269 is interposed between the cam follower 260 and the washer 240.

The actuator rod 239 has at its outer end a camming member 272 in the form of a cam pin which extends through a helical cam slot 273 in the cam follower and an axially extending guide slot 274 in the mounting bushing. Accordingly, axial movement of the actuating rod will correspondingly move the cam pin back and forth in the guide slot in the mounting post which prevents rotation of the pin about its axis. Axial movement of the actuator rod also will urge the cam pin against the sides of the helical cam slot to rotate the cam follower and the vane mount connected thereto. The ends of the guide slot in the mounting post provide positive stops for vane mount, the positive stops corresponding to full open and full closed positions of the damper vane which is attached to the vane mounting member.

The damper vane 222 is identical to the damper vane 121 of the damper assembly 120 and has fitted in the slot thereof a tubular stem 258. The lower end of the tubular stem 258 is inserted into the vane mounting member 264 and is secured for common rotational movement therewith by a pin 276.

Like the damper assembly 120, the portion of the damper assembly 220 that is intended to be located interiorly of the duct has a narrow profile in plan view. More generally, the profile of the interior portion of the damper assembly has a maximum length corresponding to the diameter of the damper vane and a maximum width that is less than the diameter of the damper vane. In the illustrated embodiment, the width corresponds to the diameter of the mounting stem 258. Accordingly, the damper assembly 220 can be mounted to a duct in essentially the same way as the damper assembly 120 is mounted to the duct. That is, the narrow profile enables the interior portion of the damper assembly to be inserted through a correspondingly narrow access hole provided in the wall of the duct with the long dimension of the access hole extending generally parallel to the axis of the duct. The support base has a width greater than the width dimension of the interior component's profile and a length dimension greater than the length dimension of the interior component's profile. Because of its larger dimensions, the support base and, in particular, the gasket therein, will span the access opening. Moreover, the gasket will conform to the contour of the duct to provide a seal around the access opening.

Although each one of the above described embodiments of the invention is shown with a circular damper vane for use in a circular duct, the invention may be practiced with damper vanes of different shapes for use with ducts of different cross-sections. For example, an oval, square or rectangular damper vane may be used to control flow through an oval, square or rectangular duct, respectively. Also, different sizes of damper vanes may be provided for different sizes of ducts. An advantage of the illustrated damper vane with the peripheral sealing flap is that a single size of damper vane may be used with more than one size of duct as the sealing flap will take-up the variation between the different sizes within a limited range.

As will be appreciated, the damper assembly of FIGS. 11 and 12 provides for especially convenient adaptation to different sizes and shapes of damper vanes. The same fluid motor and support base subassembly may be used with different dampers having mounting stems that are the same for interchangeably coupling to the support base. Accordingly, one may stock a single size fluid motor and support base subassembly along with different sizes of damper vanes.

Although the invention has been shown and described with respect to several preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A damper assembly for controlling the flow of fluid through a duct, comprising a support base for external mounting to a side of a duct, said support base having inner and outer sides, a damper vane mount fixed with respect to said support base and extending inwardly from said support base said damper vane mount having an inner end for positioning within said duct, a damper vane mounted to said inner end of said damper vane mount for movement between open and closed positions, said damper vane being located inwardly of said inner side of said support base for positioning interiorly of the duct when said support base is mounted to the duct, an actuator mounted to said support base, including an actuator member having a longitudinal axis extending generally parallel to said damper vane mount and operatively connected to said damper vane and longitudinally movable for moving said damper vane between said open and closed positions, and wherein said support base includes a closure for closing an access opening in a side wall of the duct of sufficient size to permit insertion of said damper vane therethrough.

2. A damper assembly as set forth in claim 1, wherein said closure includes a mounting member and a gasket at the inner side of said mounting member for providing a seal between said mounting member and the side wall of the duct.

3. A damper assembly as set forth in claim 1, wherein said actuator includes a fluid motor.

4. A damper assembly as set forth in claim 3, wherein said fluid motor includes a diaphragm.

5. A damper assembly as set forth in claim 4, wherein said damper vane is pivotally mounted to said damper vane mount and said actuator member is connected to said diaphragm and to a pivot block of said damper vane.

6. A damper assembly as set forth in claim 5, wherein said pivot block of said damper vane is pivotally connected to the end of said damper vane mount, said actuator member is pivotally connected to said pivot block for effecting pivoting of said pivot block in response to axial movement of said actuator member, and said pivot block has stop surfaces thereon respectively engageable with said damper vane mount and actuator member to prevent said damper vane from being rotated beyond its open and closed positions.

7. A damper assembly as set forth in claim 5, wherein said fluid motor and support base have oversize apertures for allowing free passage of said actuator member from said diaphragm out of said fluid motor and through said support base.

8. A damper assembly as set forth in claim 1, wherein said damper vane mount is a mounting post.

9. A damper assembly as set forth in claim 1, wherein said damper vane has a relatively rigid central portion and a resiliently flexible sealing flap extending around the periphery of said relatively rigid central portion.

10. A damper assembly as set forth in claim 9, wherein said damper vane includes a pair of relatively rigid outer plates and a sheet of resiliently flexible material sandwiched between said outer plates and projecting outwardly beyond peripheral edges of said outer plates to form said sealing flap.

11. A damper assembly as set forth in claim 10, wherein said damper vane is rotatable with a tubular cam follower having a cam slot therein, said tubular cam follower is supported for rotation about an axis thereof by a tubular mounting post fixed with respect to said support base, said tubular mounting post includes a guide slot, said actuator member is telescopically axially movable in said tubular mounting post and cam follower, said actuator member has thereon a cam element extending through said guide slot and cam slot, and said guide and cam slots are configured to effect rotational movement of said damper vane in response to telescoping axial movement of said actuator member.

12. A damper assembly as set forth in claim 11, wherein said mounting post extends inwardly from said inner side of said support base.

13. A damper assembly as set forth in claim 11, wherein said mounting post is located at the outer side of said support base.

14. A damper assembly as set forth in claim 11, wherein said damper vane is detachably mounted to said cam follower for interchange with other damper vanes of different sizes and shapes.

15. A method of installing a damper assembly in a duct, the damper assembly comprising a support base for external mounting to a side of a duct, the support base having inner and outer sides, a damper vane mounted to the support base for movement between open and closed positions, the damper vane being located inwardly of the inner side of the support base for positioning interiorly of the duct when the support base is mounted to the duct, and an actuator mounted to the support base and operatively connected to the damper vane for moving the damper between the open and closed positions, and wherein the support base includes a closure for closing an access opening in a side wall of the duct of sufficient size to permit insertion of the damper vane therethrough, the method comprising the steps of providing an access opening in the side wall of the duct that has a long dimension parallel to and a short dimension perpendicular to the axis of the duct, aligning the damper vane with the plane thereof generally parallel to the long dimension of the access opening and generally perpendicular to the short dimension of the access opening, inserting the damper vane through the access opening into the interior of duct, positioning the support base to close the access opening, and securing the support base directly to the side of the duct.

16. A damper assembly for controlling the flow of fluid through a duct; comprising a support base for external mounting to a side of a duct, said support base having inner and outer sides, a mounting post fixed with respect to said support base and extending inwardly from said support base along a longitudinal axis of said mounting post, a damper vane mounted to an inner portion of said mounting post for pivotal movement between open and closed positions about an axis perpendicular to the longitudinal axis of said mounting post, said damper vane being located inwardly of said inner side of said support base for positioning interiorly of the duct when said support base is mounted to the duct, and an actuator mounted to said support base and operatively connected to said damper vane for moving said damper vane between said open and closed positions separate from said mounting post.

17. A damper assembly as set forth in claim 16, wherein said support base includes a closure for closing an access opening in side wall of the duct of sufficient size to permit insertion of said damper vane therethrough.

18. A damper assembly as set forth in claim 16, wherein said actuator includes a fluid motor including a diaphragm.

19. A damper assembly as set forth in claim 18, wherein said fluid motor has an actuator member connected to said diaphragm and extending generally parallel to said mounting post for connection to said damper vane.

20. A damper assembly as set forth in claim 16, wherein said damper vane is rotatable with a tubular cam follower having a cam slot therein, said tubular cam follower is supported for rotation about an axis thereof by a tubular mounting post fixed with respect to said support base, said tubular mounting post includes a guide slot, said actuator includes an actuator member telescopically axially movable in said tubular mounting post and cam follower, said actuator member has thereon a cam element extending through said guide slot and cam slot, and said guide and cam slots are configured to effect rotational movement of said damper vane in response to telescoping axial movement of said actuator member.

21. A damper assembly as set forth in claim 16, wherein said support base, said mounting post, and said damper vane are secured together as a unit for insertion through an access opening in said duct.

\* \* \* \* \*